United States Patent [19]

Schmidt

[11] 4,107,561

[45] Aug. 15, 1978

[54] CLUTCH APPARATUS FOR GENERATING A PULSE TRAIN

[75] Inventor: Peter Schmidt, Vienna, Austria

[73] Assignee: U.S. Philips Corporation, New York, N.Y.

[21] Appl. No.: 787,611

[22] Filed: Apr. 14, 1977

Related U.S. Application Data

[63] Continuation of Ser. No. 619,846, Oct. 6, 1975, abandoned.

[30] Foreign Application Priority Data

Oct. 9, 1974 [AT] Austria .................................. 8124/74

[51] Int. Cl.² ............................................ H02K 49/04
[52] U.S. Cl. ...................................... 310/95; 310/103; 310/111; 310/168

[58] Field of Search ................. 310/95, 103, 105, 168, 310/155, 111, 99

[56]  References Cited

U.S. PATENT DOCUMENTS

| 2,603,678 | 7/1952 | Helmer | 310/103 |
| 3,223,865 | 12/1965 | Gladstone | 310/103 |
| 3,324,320 | 6/1967 | Evert | 310/95 |
| 3,470,406 | 9/1969 | Law | 310/95 |

Primary Examiner—Donovan F. Duggan
Attorney, Agent, or Firm—Frank R. Trifari; David R. Treacy

[57]  ABSTRACT

An apparatus for generating a pulse train depending on the speed of a rotary system. The external field of a coupling magnet in a slipping clutch in the rotary system is sensed to provide a measure of speed.

2 Claims, 2 Drawing Figures

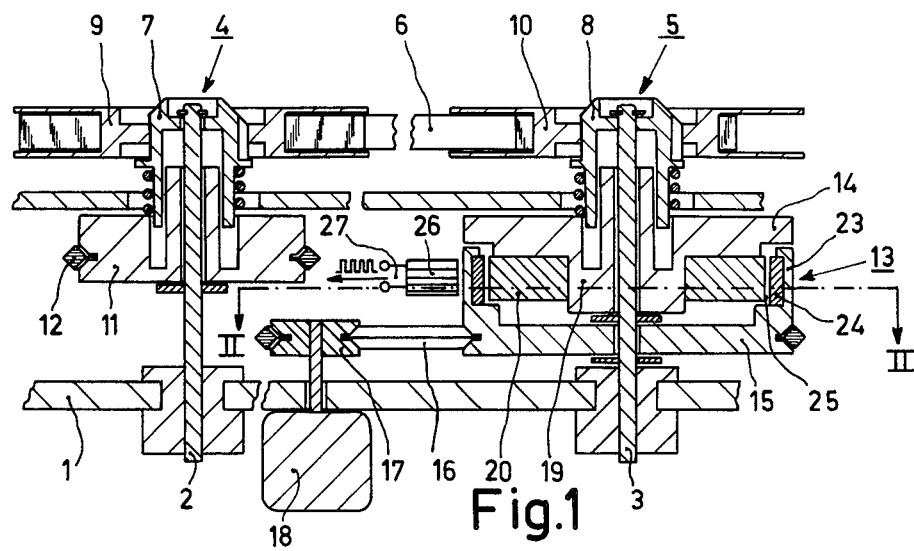
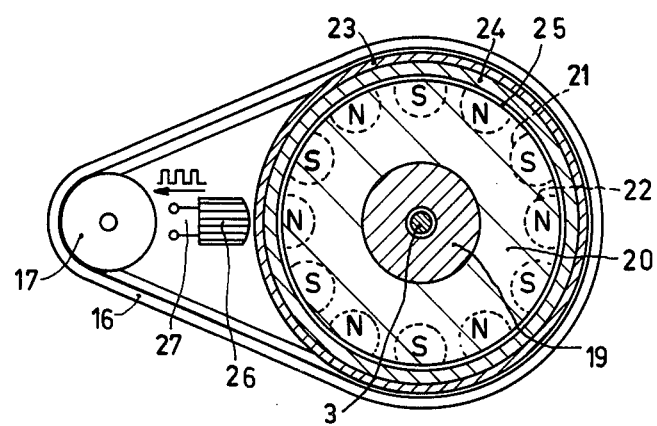

CLUTCH APPARATUS FOR GENERATING A PULSE TRAIN

This is a continuation, of application Ser. No. 619,846, filed Oct. 6, 1975 now abandoned.

The invention relates to an apparatus for generating a pulse train depending on the speed of rotation of a rotary system, in particularly for a recording and/or playback apparatus, a rotary part of said system comprising magnet poles which produce an external field, which is sensed by a stationary sensing means responding to magnetic fields and supplying the pulse train. The pulse train which is supplied by such apparatus, as is for example described in Austrian patent specification No. 278,177 or U.S. Pat. No. 3,515,921 corresponding thereto, is frequently employed for control or regulation purposes, such as for controlling apparatus functions or for controlling the speed of rotation of the rotary system, the latter in particular in recording and/or playback apparatus.

It is an object of the invention to provide a particularly simple apparatus of this type, and the invention is therefore characterized in that the rotary system comprises a magnetic slipping clutch whose external field can be sensed by the sensing means. Thus, a component of the rotary system, namely the magnetic slipping clutch, is at the same time used as a means for obtaining a pulse train, so that a particularly simple, compact construction is obtained. In this respect it is to be noted that magnetic slipping clutches are known per se; the use of such magnetic slipping clutches in recording and/or playback apparatus is also known, as appears from the article "Magnetische Rutschkupplung fur Cassetten-recorder" in the magazine "Radio Mentor", Volume 40, page 095. As previously stated, the invention is based on the recognition that such a magnetic slipping clutch may also be employed for other functions, namely for obtaining a pulse train for control, regulation or indication purposes.

The invention will be described in more detail with reference to the drawing, which shows an embodiment, although the invention is not limited thereto.

FIG. 1 shows a cross-section of the winding means for a record carrier in a recording and/or playback apparatus, and FIG. 2 shows a sectional view taken on the line II—II in FIG. 1 of the magnetic slipping clutch of a winding means.

In FIG. 1 the reference numeral 1 refers to a chassis of a recording and/or playback apparatus, on which journals 2 and 3 are arranged, on which winding means 4 and 5 for a record carrier 6 in the form of a tape are rotatably journalled. Each of the two winding means comprises a winding spindle 7 and 8 respectively, onto which reels 9 and 10 are positioned between which the record carrier 6 extends.

For transport of the record carrier from the one winding means to the other, said carrier being unwound from one reel and being wound onto the other reel, the winding spindles 7, 8 are connected to driving power sources. The winding means 4 is connected to a disk 11, which can be driven by a belt 12 in a manner not shown. The winding means 5 is driven through a magnetic slipping clutch 13, which consists of two disk-shaped sections 14 and 15 which are rotatable relative to each other and which are rotatably journalled on the journal 3. The driving section 15 is coupled to the drive wheel 17 of a motor 18 via a belt 16. The driven section 14 of the magnetic slipping clutch is connected to the winding spindle 8. On said disk-shaped section 14 a cylindrical projection 19 is provided onto which an annular permanent magnet 20 is slid. The pemanent magnet 20 is magnetized in such a way that it has magnet poles of alternating polarity at its circumference, as schematically represented in FIG. 2 by the circle portions 21 and 22 respectively. The disk-shaped section 15 is provided with an annular projection 23, which in the operating position surrounds the permanent magnet 20 and comprises a ring 24 of a material that exhibits magnetic hysteresis properties at its side which faces the permanent magnet, an airgap 25 being formed between the hysteresis ring 24 and the permanent magnet 20. Owing to the magnetic interaction between the permanent magnet 20 and the hysteresis ring 24 the section 15, when it rotates, takes along the section 14, the two sections 14 and 15 together forming a slipping clutch so that only a specific torque can be transmitted.

The apparatus includes a sensing means 26 which is responsive to magnetic fields, which means senses the external field of the magnetic slipping clutch 13. When the driven section 14 of the magnetic slipping clutch rotates the field of the magnet poles of alternating polarity of the permanent magnet 20 are consecutively sensed by the sensing means 26, so that at its output 27 a pulse train appears whose frequency depends on the speed of rotation of the driven section 14 of the slipping clutch 13 and thus of the winding means 5. Such a pulse train may then be employed for control, regulation or indication purposes in the apparatus, as is described hereinafter.

When the reels 9 and 10 are for example accommodated in a cassette, the ends of the record carrier are generally rigidly connected to the reels. When the end of the record carrier in a direction of movement thereof is reached, steps must be taken that the drive of the apparatus is switched off, which is generally effected with the aid of a so-called end-stop means. Such end-stop means are controlled by a pulse train, which depends on the record carrier transport or the rotation of one of the winding means. Since the device described hereinbefore supplies a pulse train, which depends on the rotation of the winding means 5, such a device is readily suitable for controlling an end-stop means, with which then for example the power supply to the motor 18 can be switched off. Such an end-stop means is not shown, because it may be designed in any known manner. In addition to the end-stop described above, the drive is also switched off when the winding spindle 8 of the winding means 5 comes to a standstill because of other causes, for example when the record carrier jams in the cassette. In this respect there are a great number of possibilities in respect of the method of application and thus also with respect to the choice of the mode of operation of the present device, for example depending on whether the winding means with which the slipping clutch cooperates functions as a supply or take-up means. However, this concerns the use of known concepts, which also play a part when providing separate means for obtaining a pulse train depending on the speed of rotation of a rotary system.

In particular in the case of a record carrier which is accommodated in a cassette it is often desirable that an indication is provided whether the record carrier is moving or is stationary. The device described above may be employed for this purpose, by applying its pulse train to an indication means, for example a lamp or display element, as the case may be after suitable signal conversion.

Another example of the application of the present device is the speed control of the rotary system. In that case the pulse train supplied by the sensing means 26 is fed to a control circuit for controlling the speed of rotation of the motor 18. The control circuit itself is then again of known design. In the present device the speed of rotation of the driving section 14 of the slipping clutch might be controlled. Obviously, it is also possible to mount the permanent magnet 20 on the driven section 15 of the slipping clutch 13 and the hysteresis ring 24 on the driving section 14, without basically altering the operation of the slipping clutch. In such a device the speed of rotation of the driving section 15 of the slipping clutch 13 might be controlled with the aid of the pulse train supplied by the sensing device 26, because in this case the sensing means 26 would sense the external field of the magnet poles of the permanent magnet arranged on the driving section 15 of the slipping clutch 13.

Furthermore, it is to be noted that the sensing means 26 may be designed in wide variety of manners. It may simply consist of a coil which is arranged on a U or E-shaped iron core, which is disposed in the external field of the magnetic slipping clutch; the iron core may also be formed directly by the chassis of the apparatus which is generally made of sheet-steel. However, such a coil which functions as sensing means, may also be designed in the manner commonly used for magnetic heads. Hall elements or magneto-resistors are also suitable as sensing means.

As appears from the above, a series of modifications to the embodiment described is possible without departing from the scope of the invention, the basic concept of which, as previously stated, is that a magnetic slipping clutch, known per se, which forms part of a rotary system, is at the same time used as a device for obtaining a pulse train depending on the speed of rotation of his rotary system, which pulse train may then also be utilized for further functions.

What is claimed is:

1. Apparatus for generating a pulse train depending on the speed of rotation of a rotary system, a rotary part of said system comprising magnet poles which produce an external field, which field is sensed by a stationary sensing means responding to magnetic fields and supplying the pulse train, wherein said rotary system comprises a magnetic slipping clutch having a rotary magnet portion and a magnetically coupled portion, said portions being adapted to transmit a constant torque while undergoing relative slip, said magnet poles being formed by the rotary magnet portion of the clutch, whereby said pulse train measures varying speeds corresponding to varying degrees of slip.

2. Apparatus as claimed in claim 1, wherein said rotary magnet portion is the driven clutch element for coupling to a load, rotational speed of the load being thereby determinable from the pulse frequency of the pulse train.

* * * * *